(12) United States Patent
Park et al.

(10) Patent No.: US 10,609,459 B2
(45) Date of Patent: Mar. 31, 2020

(54) APPARATUS FOR TRANSMITTING BROADCAST SIGNALS, APPARATUS FOR RECEIVING BROADCAST SIGNALS, METHOD OF TRANSMITTING BROADCAST SIGNALS AND METHOD OF RECEIVING BROADCAST SIGNALS

(71) Applicant: LG ELECTRONICS INC., Seoul (KR)

(72) Inventors: Somi Park, Seoul (KR); Minsung Kwak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/892,059

(22) Filed: Feb. 8, 2018

(65) Prior Publication Data

US 2018/0359541 A1    Dec. 13, 2018

Related U.S. Application Data

(60) Provisional application No. 62/519,100, filed on Jun. 13, 2017, provisional application No. 62/519,151, filed on Jun. 13, 2017, provisional application No. 62/533,674, filed on Jul. 18, 2017.

(51) Int. Cl.
*H04N 21/60* (2011.01)
*H04N 21/858* (2011.01)
*H04N 21/643* (2011.01)
*H04N 21/845* (2011.01)
*G06F 9/54* (2006.01)
*H04N 21/443* (2011.01)
*H04N 21/6547* (2011.01)
*H04N 21/435* (2011.01)

(52) U.S. Cl.
CPC ........ *H04N 21/8586* (2013.01); *G06F 9/54* (2013.01); *H04N 21/435* (2013.01); *H04N 21/4431* (2013.01); *H04N 21/643* (2013.01); *H04N 21/6547* (2013.01); *H04N 21/845* (2013.01)

(58) Field of Classification Search
None
See application file for complete search history.

(56) References Cited

U.S. PATENT DOCUMENTS

| | | | | |
|---|---|---|---|---|
| 5,850,218 A * | 12/1998 | LaJoie | ........... | H04N 5/44513 725/45 |
| 2015/0095956 A1* | 4/2015 | Kano | ........... | H04N 21/4126 725/80 |
| 2015/0189350 A1* | 7/2015 | Jo | ........... | H04N 21/812 725/32 |
| 2018/0279018 A1* | 9/2018 | Dravid | ........... | H04N 21/8586 |

* cited by examiner

Primary Examiner — Cai Y Chen
(74) Attorney, Agent, or Firm — Dentons US LLP

(57) ABSTRACT

The present invention is related to a method of processing a broadcast service in an apparatus. The method may comprise: receiving a broadcast signal; receiving, from an application running on the apparatus, a request based on a first Application Programming Interface (API); generating a first JavaScript Object Notation (JSON) object by including the URL for the requested OSN; and delivering, to the application, the first JSON object in response to the first API.

14 Claims, 24 Drawing Sheets

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|       case 0x01: | | |
|          SLT | var | Sec. 6.3 |
|          break; | | |
|       case 0x02: | | |
|          RRT | var | See Annex F |
|          break; | | |
|       case 0x03: | | |
|          System Time | var | Sec. 6.4 |
|          break; | | |
|       case 0x04: | | |
|          CAP | var | Sec. 6.5 |
|          break; | | |
|       default: | | |
|          reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | | | | | Use | Data Type |
|---|---|---|---|---|---|---|
| bundleDescription | | | | | | |
| | userServiceDescription | | | | | |
| | | @globalServiceID | | | 1 | anyURL |
| | | @serviceID | | | 1 | unsignedShort |
| | | @serviceStatus | | | 0..1 | boolean |
| | | @fullMPDUri | | | 1 | anyURL |
| | | @sTSIDUri | | | 1 | anyURL |
| | | name | | | 0..N | string |
| | | | @lang | | 1 | language |
| | | serviceLanguage | | | 0..N | language |
| | | capabilityCode | | | 0..1 | string |
| | | deliveryMethod | | | 1..N | |
| | | | broadcastAppService | | 1..N | |
| | | | | basePattern | 1..N | string |
| | | | unicastAppService | | 0..N | |
| | | | | basePattern | 1..N | string |

— t4010

| Element or Attribute Name | | Use | Data Type |
|---|---|---|---|
| S-TSID | | | |
| | @serviceID | 1 | unsignedShort |
| | RS | 1..N | |
| | | @bsid | 0..1 | unsignedShort |
| | | @sIpAddr | 0..1 | string |
| | | @dIpAddr | 0..1 | string |
| | | @dport | 0..1 | unsignedShort |
| | | @PLPID | 0..1 | unsignedByte |
| | | LS | 1..N | |
| | | @tsi | 1 | unsignedInt |
| | | @PLPID | 0..1 | unsignedByte |
| | | @bw | 0..1 | unsignedInt |
| | | @startTime | 0..1 | dateTime |
| | | @endTime | 0..1 | dateTime |
| | | ScrFlow | 0..1 | scrFlowType |
| | | RepairFlow | 0..1 | rprFlowType | t4020

FIG. 5

| Element or Attribute Name | Use |
|---|---|
| bundleDescription | |
|   userServiceDescription | |
|     @globalServiceID | M |
|     @serviceID | M |
|     Name | 0..N |
|       @lang | CM |
|     serviceLanguage | 0..N |
|     contentAdvisoryRating | 0..1 |
|     Channel | 1 |
|       @serviceGenre | 0..1 |
|       @serviceIcon | 1 |
|       ServiceDescription | 0..N |
|         @serviceDescrText | 1 |
|         @serviceDescrLang | 0..1 |
|     mpuComponent | 0..1 |
|       @mmtPackageId | 1 |
|       @nextMmtPackageId | 0..1 |
|     routeComponent | 0..1 |
|       @sTSIDUri | 1 |
|       @sTSIDDestinationIpAddress | 0..1 |
|       @sTSIDDestinationUdpPort | 1 |
|       @sTSIDSourceIpAddress | 1 |
|       @sTSIDMajorProtocolVersion | 0..1 |
|       @sTSIDMinorProtocolVersion | 0..1 |
|     broadbandComponent | 0..1 |
|       @fullMPDUri | 1 |
|     ComponentInfo | 1..N |
|       @ComponentType | 1 |
|       @ComponentRole | 1 |
|       @ComponentProtectedFlag | 0..1 |
|       @ComponentId | 1 |
|       @ComponentName | 0..1 |

FIG. 6
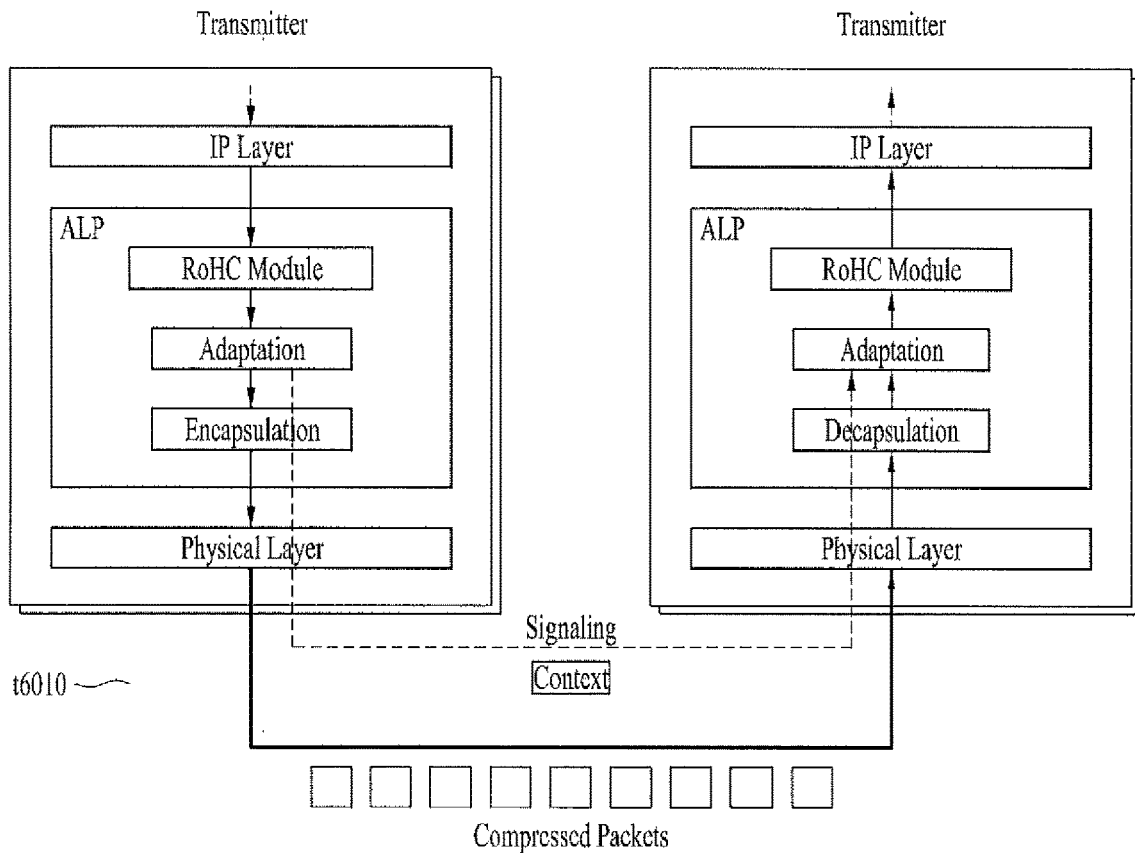
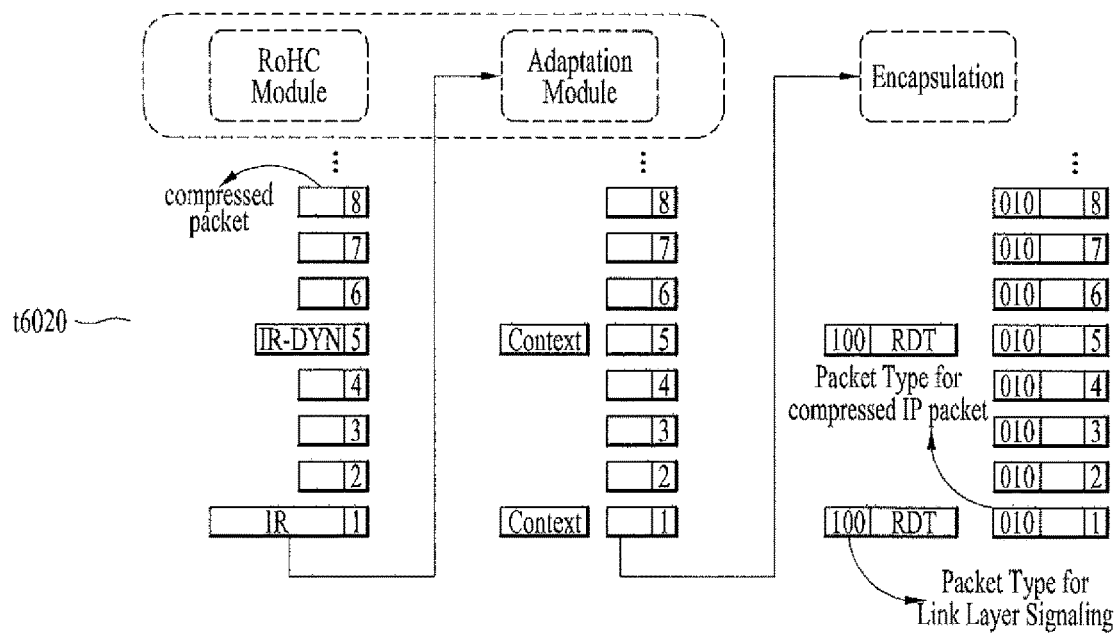

FIG. 7

| Syntax | Number of bits | Format |
|---|---|---|
| Link_Mapping_Table() { | | |
|     signaling_type | 8 | 0x01 |
|     PLP_ID | 6 | uimsbf |
|     reserved | 2 | "11" |
|     num_session | 8 | uimsbf |
|     for(i = 0 ; i < num_session ; i++) { | | |
|         src_IP_add | 32 | uimsbf |
|         dst_IP_add | 32 | uimsbf |
|         src_UDP_port | 16 | uimsbf |
|         dst_UDP_port | 16 | uimsbf |
|         SID_flag | 1 | bslbf |
|         compressed_flag | 1 | bslbf |
|         reserved | 6 | '111111' |
|         if(SID_flag == "1") { | | |
|             SID | 8 | uimsbf |
|         } | | |
|         if(compressed_flag == '1') { | | |
|             context_id | 8 | uimsbf |
|         } | | |
|     } | | |
| } | | |

```
{
  "type" : "object",
  "properties" : {
    "objectName" : {"type" : "array" , "items" :
      {"type" : "enum" : ["MPD", "AEAT", "OSN", "Content"]},
    "required" : ["objectNames"]}
  }
}
```
— 12010

```
{
  "type" : "object"
  "properties" : {
    "urlList" : {"type" : "array", "items" : {
      "objectName" : {"type" : "enum" : ["MPD", "AEAT", "OSN", "Content"]},
      "contentType" : {"type" : "string" }
      "objectUrl" : {
          "type" : "string",
          "format" : "url"
      },
      "receive Time" : {
          "type" : "string",
          "format" : "date-time"
      },
      "required" : ["objectName", "objectUrl"]}
    },
    "required" : ["urlList"]}
  }
}
```
— 12020

FIG. 13

```
{
  "jsonrpc" : "2.0",
  "method" : "org. atsc. query. ObjectUrl",
  "parame" : {
      "objectNames" : ["AEAT", "MPD", "OSN"]
  },
  "id" : 913
}
```
— 13010

```
{
  "jsonrpc" : "2.0",
  "result" : {
      "urlList" : [
          {"objectName" : "MPD",
           "objectUrl" : "http:// 127.0.0.1 : 8080 / 10.4 / MPD. xml"},
          {"objectName" : "AEAT",
           "objectUrl" : "http:// 127.0.0.1 : 8080 / .11s / AEAT. 11s"},
           "objectNames" : "OSN",
           "objectUrl" : "http:// 127.0.0.1 : 8080 / .11s / OSN. 11s",
           "receiveTime" : "2017-01-01T23 : 54 : 59 . 590Z"}
      ]
  }
  "id" : 913
}
```
— 13020

FIG. 14

```
{
    "type" : "object",
    "properties" : {
        "urlList" : ["type" : "array", "items" : {
        "objectName" : {"type" : "enum" : ["MPD", "AEAT" . "OSN", "Contrent"]}
        "comtentType" : {"type" : "string"},
        "objectUrl" : {
            "type" : "string",
            "format" : "url"
        },
        "receive Time" : {
            "type" : "string",
            "format" : "date-time"
        },
        "required" : ["objectName", "objectUrl"]}
    },
    "required" : ["urlList"]}
    },
}
```

FIG. 15

```
{
    "jsonrpc" : "2.0",
    "method" : "org. atsc. notify",
    "parame" : {
        "urlList" : [
            { "objectNames" : "MPD",
              "objectUrl" : "http:// 127.0.0.1 : 8080 / 10.4 / MPD. xml" },
        ]}
    }
}
```
— 15010

```
{
    "jsonrpc" : "2.0",
    "method" : "org . atsc . notify",
    "params" : {
        "urlList" : [
            {"objectName" : "AEAT",
             "objectUrl" : "http:// 127.0.0.1 : 8080 / .11s / AEAT. 11S" }},
            {"objectName" : "OSN",
             "objectUrl" : "http:// 127.0.0.1 : 8080 / .11s / OSN. 11s",
             "receiveTime" : "2017-01-01T23 : 54 : 59 . 590Z"}
        ]}
    }
}
```
— 15020

```
{
    "jsonrpc" : "2.0",
    "method" : "org . atsc . notify",
    "params" : {
        "urlList" : [
            {"objectName" : "AppData",
             "contentType" : "image / png",
             "objectUrl" : "http:// 127.0.0.1 : 8080 / 10.4 / img / banner_ad.png"
            }
            {"objectName" : "AppData",
             "contentType" : "text / css",
             "objectUrl" : "http:// 127.0.0.1 : 8080 / 10.4 / main_LAF.css"
            }
            {"objectName" : "AppData",
             "contentType" : "text / html",
             "objectUrl" : "http:// 127.0.0.1 : 8080 / 10.4 / promo_page.html"
            }
        ]}
    }
}
```
— 15030

FIG. 16

```
{
  "type" : "object",
  "properties" : {
    "objectName" : {"type" : "array" , "items" :
      {"type" : "enum" : ["MPD", "AEAT", "OSN", "Content"]},
    "required" : ["objectNames"]}
  }
}
```
— 16010

```
{
  "jsonrpc" : "2.0",
  "method" : "org. atsc. subscribeObjectChange",
  "parame" : {
    "objectNames" : ["AEAT", "MPD", "Content"]
  },
  "id" : 55
}
```
— 16020

```
{
  "jsonrpc" : "2.0",
  "result" : { },
  "id" : 55
}
```
— 16030

FIG. 17

```
{
  "type" : "object",
  "properties" : {
    "objectName" : {"type" : "array", "items" :
      {"type" : "enum" : ["MPD", "AEAT", "OSN", "Content"]},
    "required" : ["objectNames"]}
  }
}
```
— 17010

```
{
  "jsonrpc" : "2.0",
  "method" : "org. atsc. subscribeObjectChange",
  "parame" : {
    "objectNames" : ["AEAT"]
  },
  "id" : 56
}
```
— 17020

```
{
  "jsonrpc" : "2.0",
  "result" : { },
  "id" : 56
}
```
— 17030

```
{
  "jsonrpc" : "2.0",
  "method" : "org. atsc. subscribeObjectChange",
  "parame" : {
    "objectNames" : [ ]
  },
  "id" : 312
}
```
— 17040

FIG. 18

```
{
    "type" : "object",
    "properties" : {
        "receptionTime" : {"type" : "string", "format" : "date-time"},
        "notificationDuration" : {"type" : "duration"},
        "kscFlag" : {"type" : "boolean"},
        "version" : {"type" : "integer"},
    }, "required" : ["receptionTime"]
}
```
— 18010

```
{
    "jsonrpc" : "2.0",
    "method" : "org. atsc. query . onscreenMessageNotification",
    "id" : 55
}
```
— 18020

```
{
    "jsonrpc" : "2.0",
    "result" : {
        "receptionTime" : "2017-01-01T23 : 54 : 59. 590Z",
        "notificationDuration" : "PT5M",
        "kscFlag" : true,
        "version" : 1 }
    }
    "id" : 55
}
```
— 18030

FIG. 19

```
{
  "type" : "object",
  "properties" : {
      "msgType" : {"type" : {"enum" : ["onscreenMessage"]}}
      "receptionTime" : {"type" : "string", "format" : "data-time"},
      "notificationDuration" : {"type" : "duration"},
      "kscFlag" : {"type" : "boolean"},
      "version" : {"type" : "integer"},
  }, "required" : ["msgType", "receptionTime"]
}
```
— 19010

```
← {
  "jsonrpc" : "2.0",
  "method" : "org.atsc.notify",
  "parms" : {
      "msgType" : "onscreenMessage",
      "receptionTime" : "2017-01-01T23:54:59.590Z",
      "notificationDuration" : "PT5M",
      "kscFlag" : true,
      "version" : 1 }
}
```
— 19020

FIG. 20

```
{
  "type" : "object",
  "properties" : {
      "validFrom" : {"type" : "string", "format" : "date-time"},
      "validUntil" : {"type" : "string", "format" : "date-time"},
      "clean" : {"type" : "boolean"},
  }, "required" : ["validUntil", "clean"]
}
```
— 20010

```
{
"jsonrpc" : "2.0",
"method" : "org.atsc.query.screenClean",
"id" : 55
}
```
— 20020

```
{
"jsonrpc" : "2.0",
"result" : {
    "validFrom" : "2017-01-01T23:54:59.590Z",
    "validUntil" : "2017-01-01T23:59:59.590Z",
    "clean" : true}
    "version" : 1 }
},
"id" : 55
}
```
— 20030

FIG. 21

```
{
  "type" : "object",
  "properties" : {
      "msgType" : {"type" : {"enum" : ["screenClean"]}},
      "validFrom" : {"type" : "string", "format" : "date-time"},
      "validUntil" : {"type" : "string", "format" : "date-time"},
      "clean" : {"type" : "boolean"},
  }, "required" : ["msgType", "validUntil", "clean"]
}
```
— 21010

```
{
  "jsonrpc" : "2.0",
  "method" : "org. atsc. notify",
  "params" : {
      "msgType" : "screenClean",
      "validFrom" : "2017-01-01T23 : 54 : 59.590Z",
      "validUntil" : "2017-01-01T23 : 59 : 59.590Z",
      "clean" : true}
}
```
— 21020

FIG. 22

```
{
  "type" : "object",
  "properties" : {
    "resourceBlocking" : {"type" : "boolean"},
    "displayOverride" : {"type" : "boolean"}
  }
}
```
— 22010

```
{
  "jsonrpc" : "2.0",
  "method" : "org.atsc.query.resourceBlocking",
  "id" : 62
}
```
— 22020

```
{
  "jsonrpc" : "2.0",
  "result" : {
    "resourceBlocking" : true,
    "displayOverride" : true
  }
  "id" : 62
}
```
— 22030

```
{
  "jsonrpc" : "2.0",
  "result" : {
    "resourceBlocking" : false,
    "displayOverride" : true
  },
  "id" : 62
}
```
— 22040

FIG. 23

| WebSocket Interface Function | URL | Receiver Support |
|---|---|---|
| Command and Control | WSPath / atscCmd | Required |
| Video | WSPath / atscVid | Optional |
| Audio | WSPath / atscAud | Optional |
| Captions | WSPath / atscCap | Optional |
| Companion Device | WSPath / atscCD | Required |

APPARATUS FOR TRANSMITTING BROADCAST SIGNALS, APPARATUS FOR RECEIVING BROADCAST SIGNALS, METHOD OF TRANSMITTING BROADCAST SIGNALS AND METHOD OF RECEIVING BROADCAST SIGNALS

This application claims the benefit of U.S. Provisional Patent Application Nos. 62/519,100, filed on Jun. 13, 2017, 62/519,151, filed on Jun. 13, 2017, and 62/533,674, filed on Jul. 18, 2017, which are hereby incorporated by reference as if fully set forth herein.

BACKGROUND OF THE INVENTION

Field of the Invention

The present invention relates to an apparatus for transmitting broadcast signals, an apparatus for receiving broadcast signals, a method of transmitting broadcast signals, and a method of receiving broadcast signals.

Discussion of the Related Art

As analog broadcast signal transmission comes to an end, various technologies for transmitting/receiving digital broadcast signals have been developed. A digital broadcast signal may include a larger amount of video/audio data than an analog broadcast signal and further include various types of additional data in addition to the video/audio data.

SUMMARY OF THE INVENTION

That is, a digital broadcast system can provide high definition (HD) images, multi-channel audio and various additional services. However, data transmission efficiency for transmission of large amounts of data, robustness of transmission/reception networks and network flexibility in consideration of mobile reception equipment need to be improved for digital broadcast.

According to an object of the present invention, as included herein and briefly described, the present invention proposes a system for effectively supporting a next-generation broadcast service in an environment that supports next-generation hybrid broadcast using a terrestrial broadcast network and an Internet protocol (IP) network, and a related signaling scheme.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 9 illustrates a write operation of a time interleaver according to an embodiment of the present invention.

FIG. 12 is a diagram a URL request API according to an embodiment of the present invention.

FIG. 13 is a diagram showing an application example of a URL request API according to the present invention.

FIG. 14 is a diagram showing a signaling change notification API according to an embodiment of the present invention.

FIG. 15 is a diagram showing an application example of a signaling change notification API according to the present invention.

FIG. 16 is a diagram showing an example of a signaling change subscribe API according to an embodiment of the present invention FIG. 17 is a diagram showing a signaling change unsubscribe API according to an embodiment of the present invention.

FIG. 18 is a diagram showing an OSN request API according to an embodiment of the present invention.

FIG. 19 is a diagram showing an OSN notification API according to an embodiment of the present invention.

FIG. 20 is a diagram showing a screen clean request API according to an embodiment of the present invention.

FIG. 21 is a diagram showing a screen clean notification API according to an embodiment of the present invention.

FIG. 22 is a diagram showing a display override request API according to an embodiment of the present invention.

FIG. 23 is a diagram showing a method of acquiring a WebSocket sever address by an application according to an embodiment of the present invention.

DETAILED DESCRIPTION OF THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that may be implemented according to the present invention. The following detailed description includes specific details in order to provide a thorough understanding of the present invention. However, it will be apparent to those skilled in the art that the present invention may be practiced without such specific details.

Although most terms used in the present invention have been selected from general ones widely used in the art, some terms have been arbitrarily selected by the applicant and their meanings are explained in detail in the following description as needed. Thus, the present invention should be understood based upon the intended meanings of the terms rather than their simple names or meanings.

The present invention provides apparatuses and methods for transmitting and receiving broadcast signals for future broadcast services. Future broadcast services according to an embodiment of the present invention include a terrestrial broadcast service, a mobile broadcast service, a UHDTV service, etc. The present invention may process broadcast signals for the future broadcast services through non-MIMO or MIMO according to one embodiment. A non-MIMO scheme according to an embodiment of the present invention may include a multiple input single output (MISO) scheme, a single input single output (SISO) scheme, etc. The present invention proposes a physical profile (or system) optimized to minimize receiver complexity while attaining the performance required for a particular use case.

Figure 1:
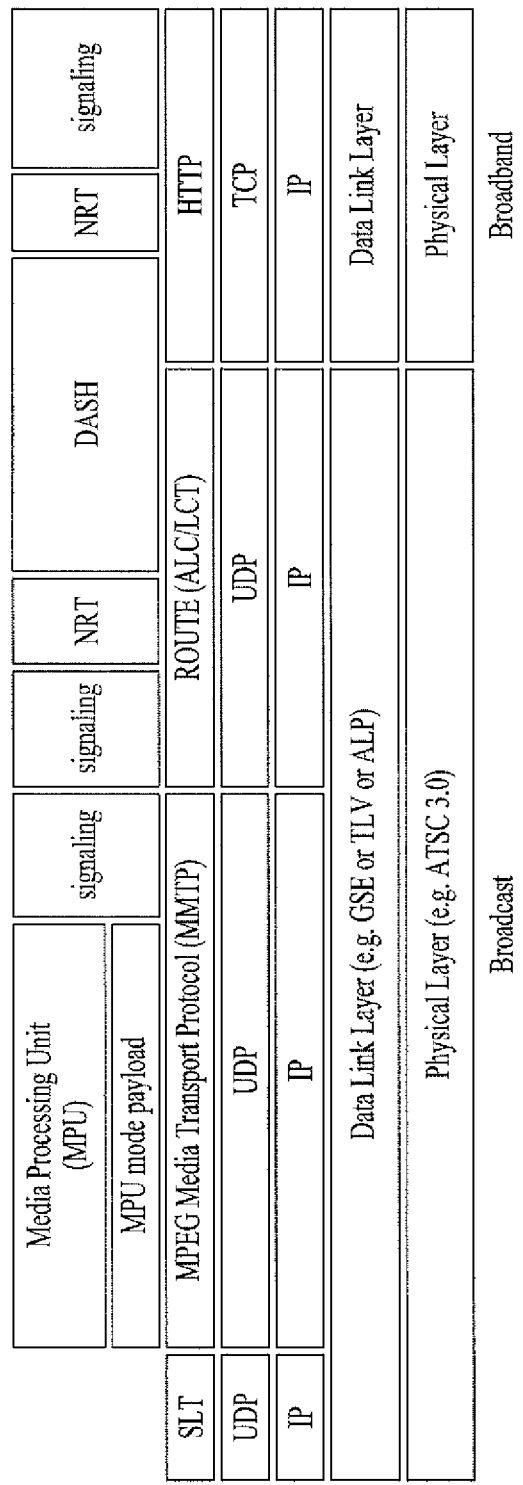
FIG. 1 is a diagram showing a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
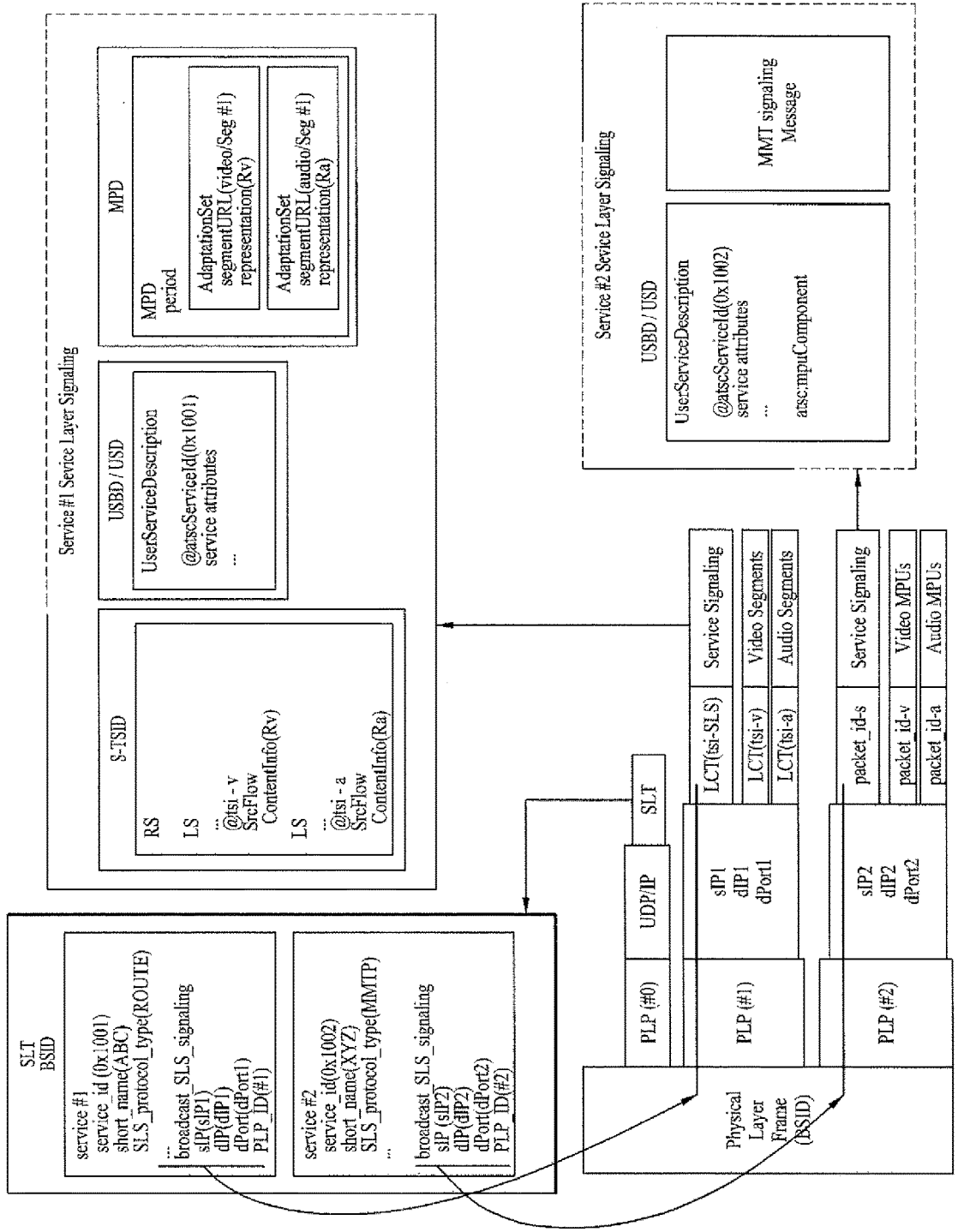
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet_id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet_id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an svcInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The svcInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset_id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service-IP information-context information-PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast.

Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling_type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field.

According to the number indicated by the num_session field, information on each session may be included. This information may include a src_IP_add field, a dst_IP_add field, a src_UDP_port field, a dst_UDP_port field, an SID_flag field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
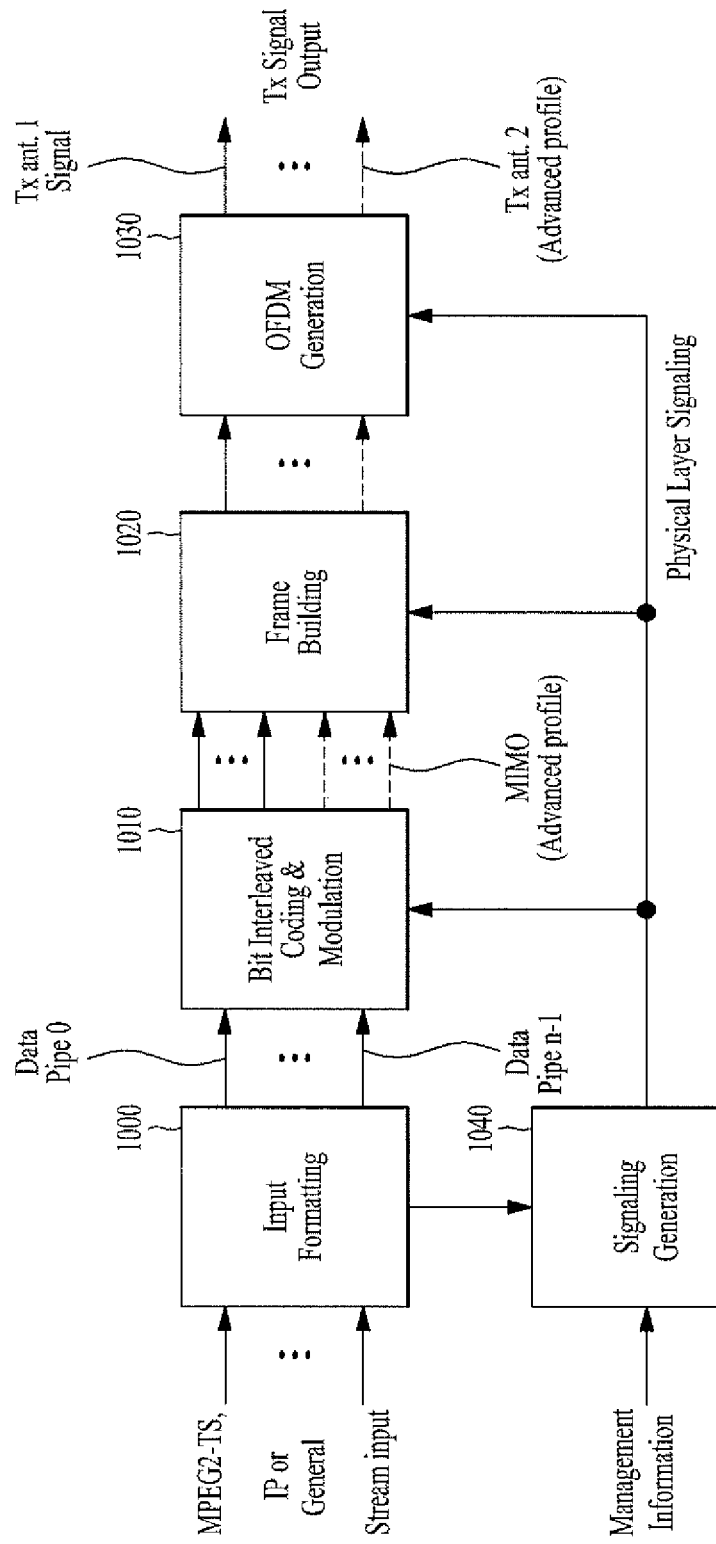
FIG. 8 illustrates a configuration of a broadcast signal transmission apparatus for future broadcast services according to an embodiment of the present invention.

FIG. 8 illustrates a configuration of a broadcast signal transmission apparatus for future broadcast services according to an embodiment of the present invention.

The broadcast signal transmission apparatus for future broadcast services according to the present embodiment may include an input formatting block 1000, a bit interleaved coding & modulation (BICM) block 1010, a frame building block 1020, an OFDM generation block 1030 and a signaling generation block 1040. Description will be given of an operation of each block of the broadcast signal transmission apparatus.

In input data according to an embodiment of the present invention, IP stream/packets and MPEG2-TS may be main input formats, and other stream types are handled as general streams.

The input formatting block 1000 may demultiplex each input stream into one or a plurality of data pipes, to each of which independent coding and modulation are applied. A DP is the basic unit for robustness control, which affects QoS. One or a plurality of services or service components may be carried by one DP. The DP is a logical channel in a physical layer for delivering service data or related metadata capable of carrying one or a plurality of services or service components.

Since QoS depends on characteristics of a service provided by the broadcast signal transmission apparatus for future broadcast services according to the embodiment of the present invention, data corresponding to respective services needs to be processed using different schemes.

BICM block 1010 may include a processing block for a profile (or system) to which MIMO is not applied, and a processing block for a profile (or system) to which MIMO is applied and may comprise a plurality blocks for processing each Data Pipe.

A processing block of the BICM block to which MIMO is not applied may include a data FEC encoder, a bit interleaver, a constellation mapper, a signal space diversity (SSD) encoding block and a time interleaver. A processing block of the BICM block to which MIMO is applied may is distinguished from the processing block of the BICM block to which MIMO is not applied in that the processing block further includes a cell-word demultiplexer and a MIMO encoding block The data FEC encoder performs FEC encoding on an input BBF to generate FECBLOCK procedure using outer coding (BCH) and inner coding (LDPC). The outer coding (BCH) is optional coding method. The bit interleaver may interleave outputs of the data FEC encoder to achieve optimized performance with a combination of LDPC codes and a modulation scheme while providing an efficiently implementable structure. A detailed operation of the bit interleaver will be described later.

The constellation mapper may modulate each cell word from the bit interleaver or the cell-word demultiplexer in the advanced profile using either QPSK, QAM-16, non-uniform QAM (NUQ-64, NUQ-256, or NUQ-1024) or non-uniform constellation (NUC-16, NUC-64, NUC-256, or NUC-1024) mapping to give a power-normalized constellation point. This constellation mapping is applied only for DPs. It is observed that QAM-16 and NUQs are square shaped, while NUCs have arbitrary shapes. Both NUQs and NUCs are defined specifically for each code rate and the particular one used is signaled by the parameter DP_MOD field in the PLS2 data. The time interleaver may operates at a DP level. Parameters of time interleaving (TI) may be set differently for each DP. The time interleaver according to an embodiment of the present invention can be positioned between a BICM chain block and a frame builder.

Here, The time interlaever according to an embodiment of the present invention can use both a convolutional interleaver (CI) and a block interleaver (BI) or selectively using either the CI or the BI according to a physical layer pipe (PLP) mode. A PLP according to an embodiment of the present invention is a physical path corresponding to the same concept as that of the above-described DP, and a name of the PLP may be changed by a designer. A PLP mode according to an embodiment of the present invention may include a single PLP mode or a multi-PLP mode according to the number of PLPs processed by a broadcast signal transmitter or a broadcast signal transmission apparatus. In the present invention, time interleaving in which different time interleaving schemes are applied according to PLP modes may be referred to as hybrid time interleaving.

The hybrid time interleaver may include a BI and a CI. That is, when PLP_NUM=1, the BI is not applied (BI is turned OFF) and only the CI is applied. When PLP_NUM>1, both the BI and the CI may be applied (BI is turned ON). A structure and an operation of the CI applied when PLP_NUM>1 may be different from a case of PLP_NUM=1. The hybrid time deinterleaver may perform an operation corresponding to an inverse operation of the hybrid time interleaver described above.

The cell-word demultiplexer is used for dividing a single cell-word stream into dual cell-word streams for MIMO processing. The MIMO encoding block may process an output of the cell-word demultiplexer using a MIMO encoding scheme. The MIMO encoding scheme of the present invention may be defined as full-rate spatial multiplexing (FR-SM) to provide capacity increase with relatively small complexity increase at the receiver side. MIMO processing is applied at the DP level. NUQ ($e_1,i$ and $e_2,i$) corresponding to a pair of constellation mapper outputs is fed to an input of a MIMO encoder and paired MIMO encoder output ($g_1,i$ and g2,i) is transmitted by the same carrier k and OFDM symbol l of respective TX antennas thereof.

The frame building block 1020 may map the data cells of the input DPs into the OFDM symbols within a frame, and perform frequency interleaving for frequency-domain diversity.

A frame according to an embodiment of the present invention is further divided into a preamble, one or more frame signaling symbols (FSSs), normal data symbols. The preamble provides a set of basic transmission parameters for efficient transmission and reception of a signal. And the preamble indicates whether the emergency alert service (EAS) is provided in a current frame or not. A main purpose of the FSS is to carry PLS data. For fast synchronization and channel estimation, and hence fast decoding of PLS data, the FSS has a dense pilot pattern than a normal data symbol.

The frame building block 1020 may include a delay compensation block for adjusting timing between DPs and corresponding PLS data to ensure that the DPs and the corresponding PLS data are co-timed at a transmitter side, a cell mapper for mapping PLS, DPs, auxiliary streams, dummy cells, etc. to active carriers of the OFDM symbols in the frame and a frequency interleaver.

The frequency interleaver may randomly interleave data cells received from the cell mapper to provide frequency diversity. In addition, the frequency interleaver may operate on data corresponding to an OFDM symbol pair including two sequential OFDM symbols or an OFDM symbol using a different interleaving-seed order to obtain maximum interleaving gain in a single frame.

The OFDM generation block 1030 modulates OFDM carriers by cells produced by the frame building block, inserts pilots, and produces a time domain signal for transmission. In addition, this block subsequently inserts guard intervals, and applies peak-to-average power ratio (PAPR) reduction processing to produce a final RF signal.

The signaling generation block 1040 may create physical layer signaling information used for an operation of each functional block. Signaling information according to an embodiment of the present invention may include PLS data. The PLS data includes PLS1 data and PLS2 data.

The PLS1 data is a first set of PLS data carried in an FSS symbol in a frame having a fixed size, coding and modulation, which carries basic information about the system in addition to the parameters needed to decode the PLS2 data. The PLS1 data provides basic transmission parameters including parameters required to enable reception and decoding of the PLS2 data. In addition, the PLS1 data remains constant for the duration of a frame group.

The PLS2 data is a second set of PLS data transmitted in an FSS symbol, which carries more detailed PLS data about the system and the DPs. The PLS2 contains parameters that provide sufficient information for the receiver to decode a desired DP. The PLS2 signaling further includes two types of parameters, PLS2 static data (PLS2-STAT data) and PLS2 dynamic data (PLS2-DYN data). The PLS2 static data is PLS2 data that remains static for the duration of a frame group and the PLS2 dynamic data is PLS2 data that dynamically changes frame by frame.

PLS2 data can include FIC_flag information. FIC (fast information channel) is a dedicated channel for carrying cross-layer information to enable fast service acquisition and channel scanning FIC_FLAG is a 1-bit field and indicates whether the FIC is used in a current frame. If this field is set to '1', the FIC is provided in the current frame. If this field set to '0', the FIC is not carried in the current frame.

The BICM block 1010 may include BICM block for protection of the PLS data including a PLS FEC encoder, a bit interleaver and a constellation mapper.

The PLS FEC encoder may include a scrambler for scrambling PLS1 data and PLS2 data, a BCH encoding/zero insertion block for outer encoding on the scrambled PLS1,2 data using a shortened BCH code for PLS protection, and insert zero bits after BCH encoding, an LDPC encoding block for LDPC encoding using an LDPC code and an LDPC parity puncturing block. The bit interleaver may interleave each of shortened and punctured PLS1 data and PLS2 data. The constellation mapper may map the bit-interleaved PLS1 data and PLS2 data to constellations.

The broadcast signal reception apparatus for future broadcast services according to the embodiment of the present invention may correspond to the broadcast signal transmission apparatus for future broadcast services described with reference to FIG. 8.

The broadcast signal reception apparatus for future broadcast services according to the embodiment of the present invention may include a synchronization & demodulation module carrying out demodulation corresponding to a reverse procedure of a procedure performed by the broadcast signal transmission apparatus, a frame parsing module parsing input signal frames and extracting data through which a service selected by a user is transmitted, a demapping & decoding module which convert input signals into bit domain data and then deinterleave the same as necessary, perform demapping of mapping applied for transmission efficiency and correct an error generated on a transmission channel through decoding, an output processor performing reverse procedures of various compression/signal processing procedures which are applied by the broadcast signal transmission apparatus and a signaling decoding module obtaining PLS information from a signal demodulated by the synchronization & demodulation module.

The frame parsing module, the demapping & decoding module and the output processor may execute functions thereof using data output from the signaling decoding module.

According to an embodiment of the present invention, each TI group is either mapped directly to one frame or spread over PI frames. Each TI group is also divided into more than one TI block (NTI), where each TI block corresponds to one usage of a time interleaver memory. The TI blocks within the TI group may contain slightly different numbers of XFECBLOCKs. Typically, the time interleaver may also function as a buffer for DP data prior to a process of frame building.

The Time interleaving according to an embodiment of the present invention is a twisted row-column block interleaver. The twisted row-column block interleaver according to an embodiment of the present invention may column-wise write a first XFECBLOCK into a first column of a TI memory, and a second XFECBLOCK into a next column, and so on). Then, in an interleaving array, cells are diagonal-wise read diagonal-wise from a first row (rightwards along a row beginning with a left-most column) to a last row, Nr cells are read out Moreover, in order to achieve single-memory deinterleaving at a receiver side regardless of a number of XFEC-BLOCKs in a TI block the twisted row-column block interleaver may insert the virtual XFECBLOCKs into the TI memory. The virtual XFECBLOCKs must be inserted in front of other FECBLOCKS to achieve single-memory deinterleaving at a receiver side.

Figure 9:
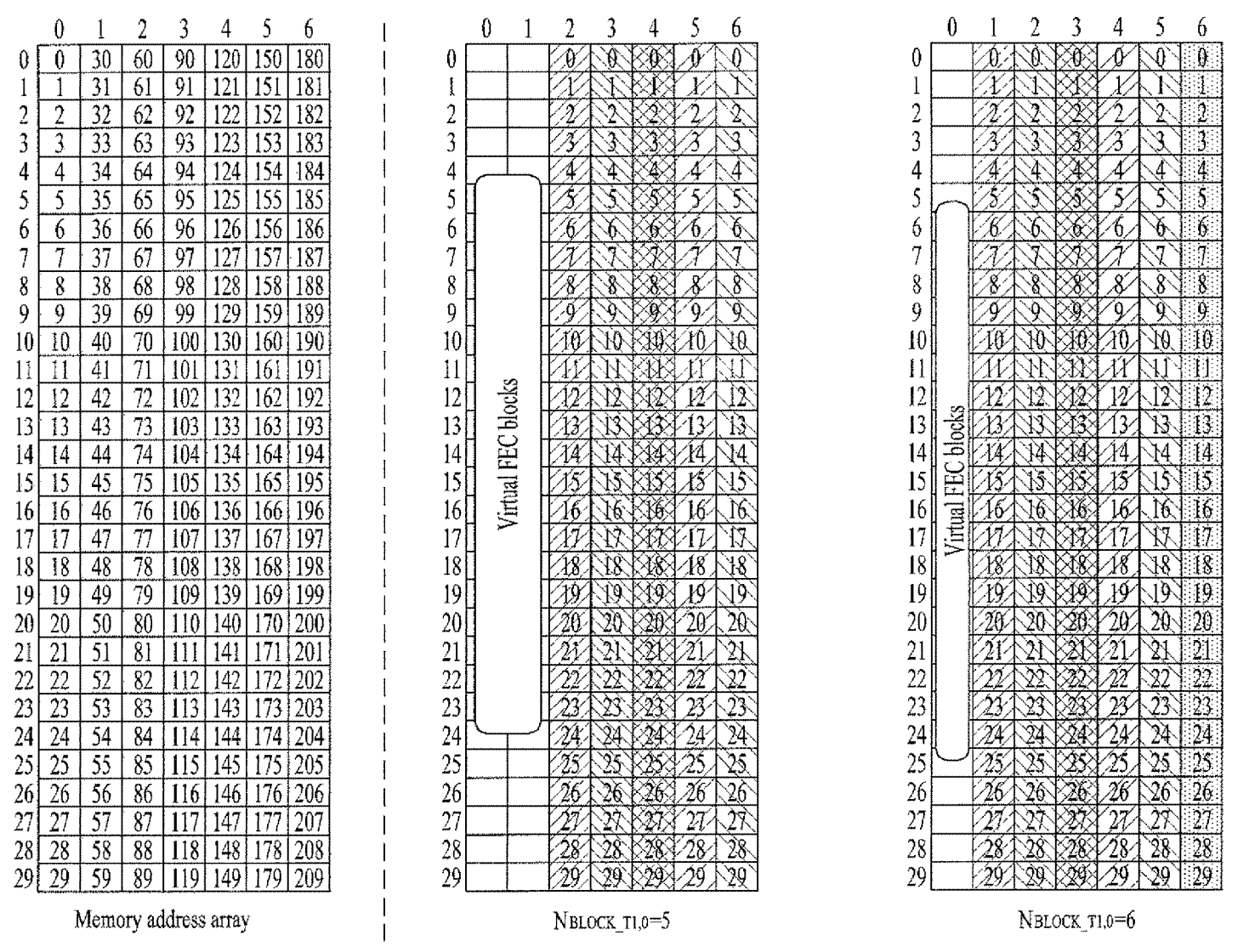

FIG. 9 illustrates a write operation of a time interleaver according to an embodiment of the present invention.

A left block in the figure illustrates a TI memory address array, and right blocks in the figure illustrate a write operation when two virtual FEC blocks and one virtual FEC block are inserted into heads of two contiguous TI groups, respectively.

The frequency interleaver according to the present embodiment may include an interleaving address generator for generating an interleaving address for applying corresponding data to a symbol pair.

Figure 10:
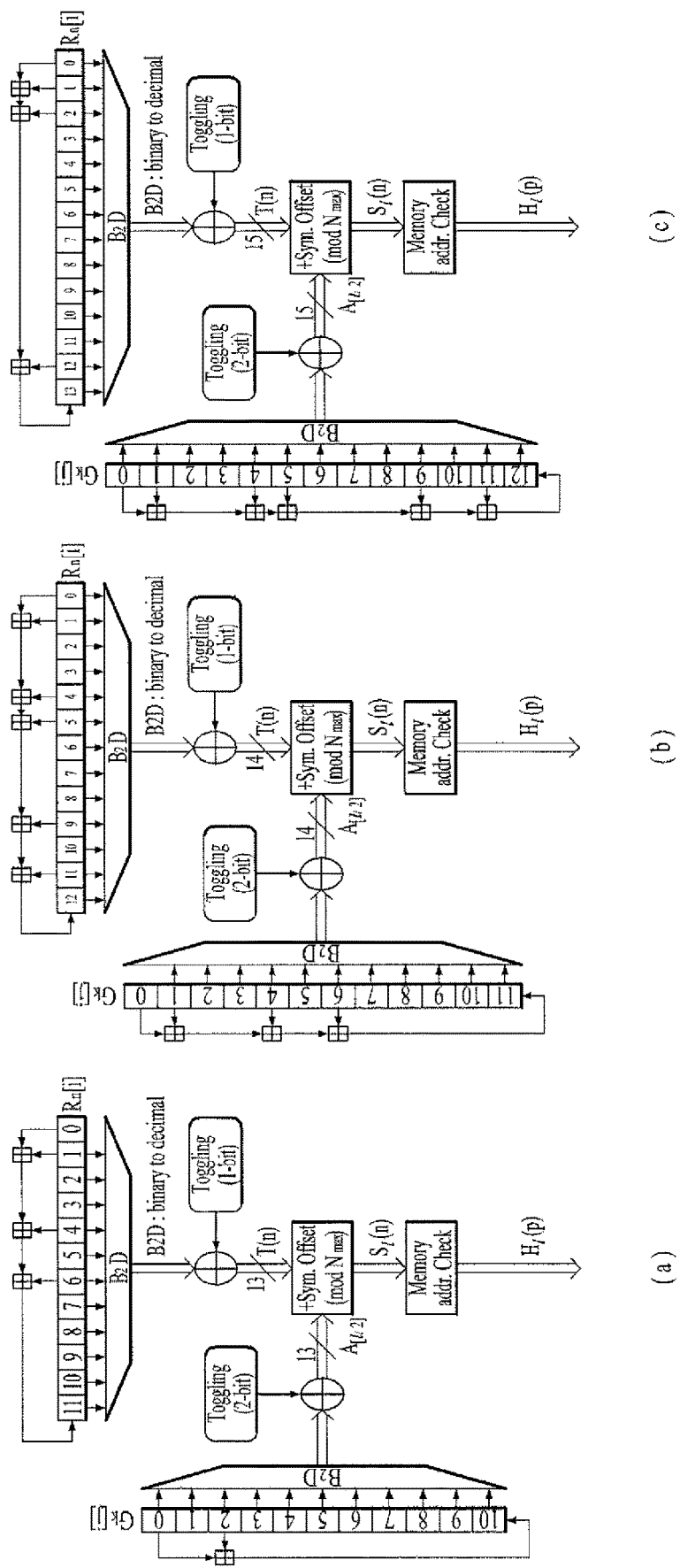
FIG. 10 illustrates an interleaving address generator including a main pseudo-random binary sequence (PRBS) generator and a sub-PRBS generator according to each FFT mode which are included in a frequency interleaver according to an embodiment of the present invention.

FIG. 10 illustrates an interleaving address generator including a main pseudo-random binary sequence (PRBS) generator and a sub-PRBS generator according to each FFT mode which are included in a frequency interleaver according to an embodiment of the present invention.

(a) shows the block diagrams of the interleaving-address generator for 8K FFT mode, (b) shows the block diagrams of the interleaving-address generator for 16K FFT mode and (c) shows the block diagrams of the interleaving-address generator for 32K FFT mode.

The interleaving process for the OFDM symbol pair is described as follows, exploiting a single interleaving-sequence. First, available data cells (the output cells from the Cell Mapper) to be interleaved in one OFDM symbol $O_{m,1}$ is defined as $O_{m,1}=[x_{m,1,0}, \ldots, x_{m,1,p}, \ldots, x_{m,1,Ndata-1}]$ for $l=0, \ldots, N_{sym}-1$, where $x_{m,1,p}$ is the $p^{th}$ cell of the $l^{th}$ OFDM symbol in the $m^{th}$ frame and $N_{data}$ is the number of data cells: $N_{data}=C_{FSS}$ for the frame signaling symbol(s), $N_{data}=C_{data}$ for the normal data, and $N_{data}=C_{FES}$ for the frame edge symbol. In addition, the interleaved data cells are defined as $P_{m,1}=[v_{m,1,0}, \ldots, v_{m,1,Ndata-1}]$ for $l=0, \ldots, N_{sym}-1$.

For the OFDM symbol pair, the interleaved OFDM symbol pair is given by $v_{m,1,Hi(p)}=x_{m,1,p}$, $p=0, \ldots, N_{data}-1$, for the first OFDM symbol of each pair $v_{m,1,p}=x_{m,1,p}=x_{m,1,Hi(p)}$, $p=0, \ldots, N_{data}-1$ for the second OFDM symbol of each pair, where $H_i(p)$ is the interleaving address generated based on a PRBS generator and a cyclic shift value (symbol offset) of a sub-PRBS generator.

Figure 11:
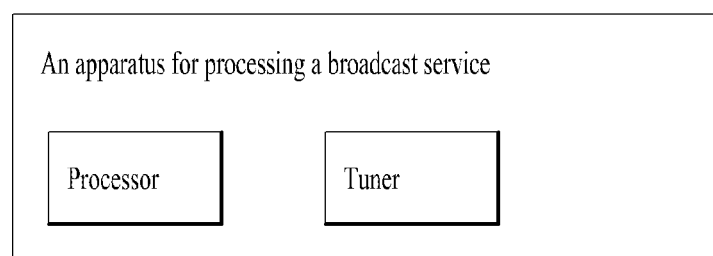
FIG. 11 is a diagram of an apparatus for processing a broadcast service according to an aspect of the present invention.

FIG. 11 is a diagram of an apparatus for processing a broadcast service according to an aspect of the present invention.

According to an aspect, the present invention may be related to the broadcast service processing apparatus. The broadcast service processing apparatus may receive service data and/or signaling information of a broadcast service and may communicate with an application to appropriately provide a corresponding broadcast service.

In detail, the broadcast service processing apparatus may receive a broadcast signal having service data and/or signaling information, receive a request for on screen message notification (OSN) information using API from an application, generate an answer for acquisition of the OSN in response to the API, and transmit the answer to the corresponding application.

The broadcast service processing apparatus according to the present invention may include a tuner and/or a processor as an internal/external component. Here, the processor may be a hardware processor.

The tuner may receive a broadcast signal. The broadcast signal may include service data of a broadcast service and/or signaling information for signaling the corresponding broadcast service. The signaling information may further include OSN information. The OSN may indicate broadcaster's preference about whether video images of a broadcast service are capable of being hidden by another application.

That is, the OSN information may indicate whether it is fine that video of a broadcast service at a time point is hidden by an application, other graphic overlay, and so on.

The processor may acquire the service data and/or the signaling information from the broadcast signal to provide the broadcast service. The processor may provide an application environment in which an application is executable in the broadcast service processing apparatus. Here, the application may be executed by the broadcast service processing apparatus.

The processor may communicate with an application through an application programming interface (API) or the like. The processor may receive a request based on a uniform resource locator (URL) request API from the application. Here, the URL request API may be an API for making a request for signaling metadata or the like from the broadcast service processing apparatus. In some embodiments, the URL request API may be an API for making a request or a URL for referencing latest acquired OSN.

The processor may generate an object for response to the URL request API. In some embodiments, the objet may be a JavaScript object notation (JSON) object. The JSON object may be referred to as a first JSON object in some embodiments. The first JSON object may include a URL for the requested signaling metadata. In some embodiments, the first JSON object may include a URL for the requested OSN.

Then, the processor may transmit the first JSON object to the application in response to the URL request API.

In a broadcast service processing apparatus according to an embodiment of the present invention, the processor may further insert time information into the first JSON object while generating the first JSON object. The time information may indicate a time point of receiving metadata requested by the API. In some embodiments, the time information may indicate a time point of receiving the requested OSN.

In a broadcast service processing apparatus according to another embodiment of the present invention, the processor may receive a subscription request based on the signaling change subscribe API. Here, the signaling change subscribe API may be referred to as a second API. The signaling change subscribe API may be an API issued in the broadcast service processing apparatus by an application to signal notification to the application when metadata requested by the corresponding API is changed. Here, in some embodiments, the requested metadata may be OSN.

In a broadcast service processing apparatus according to another embodiment of the present invention, the signaling change subscribe API may include a second JSON object. The second JSON object may include information for making a request for notification. The information may be used to signal notification to the application by the broadcast service processing apparatus when the broadcast service processing apparatus receives a new version or updated version of the requested metadata. Here, in some embodiments, the requested metadata may be OSN.

In a broadcast service processing apparatus according to another embodiment of the present invention, the processor may issue the signaling change notification API to transmit notification to the application that makes a request for subscription. Here, the signaling change notification API may be referred to as a third API. The signaling change notification API may be an API for notifying an application about change in the metadata requested by the corresponding API. Here, in some embodiments, the requested metadata may be OSN.

In a broadcast service processing apparatus according to another embodiment of the present invention, the aforementioned signaling change notification API may include a third JSON object. The third JSON object may include a URL for referencing new or updated metadata and/or information indicating a time point of receiving the corresponding new or updated metadata. Here, in some embodiments, the requested metadata may be OSN.

In a broadcast service processing apparatus according to another embodiment of the present invention, an application and the broadcast service processing apparatus may communicate with each other through a web socket protocol.

In a broadcast service processing apparatus according to another embodiment of the present invention, the processor may receive an unsubscription request according to the signaling change unsubscribe API from the application. The application that transmits the subscription request by the aforementioned signaling change subscribe API may make a request for unsubscription via the signaling change unsubscribe API.

In a broadcast service processing apparatus according to another embodiment of the present invention, the broadcast service processing apparatus and/or the application may transmit and signal a URL for access to OSN and make a request for subscription and unsubscription.

In a broadcast service processing apparatus according to embodiments of the present invention, an application may check that OSN is transmitted to a broadcast service processing apparatus of a receiver side even if the application is arbitrarily terminated or hidden.

In a broadcast service processing apparatus according to embodiments of the present invention, an application may accurately recognize a time period for clearing a screen through reception visual information of OSN.

In a broadcast service processing apparatus according to embodiments of the present invention, a broadcast application or a native application of a receiver may share corresponding signaling information, metadata, and/or the aforementioned contents through the aforementioned API, and so on, thereby reducing an entire required bandwidth.

The aforementioned broadcast service processing apparatuses according to embodiments of the present invention may be combined. The aforementioned internal/external components of the broadcast service processing apparatus according to the present invention may be added, changed, replaced, or deleted in some embodiments. The aforementioned internal/external components of the broadcast service processing apparatus may be embodied as a hardware component.

A next-generation broadcast system and a broadcast service processing apparatus based thereon may provide a broadcast service in the form of a combination of broadcasting and a network. That is, the next-generation broadcast system may show an application to a user to allow the user and broadcasting to interact with each other through the application and, accordingly, the user may experience much content as possible.

An application may be launched in a broadcast service processing apparatus, for example, a TV. In some embodiments, application operations according to the present invention may also be applied to TVs with different platforms. In some embodiments, a web socket protocol may be used as an interface between a broadcast service processing apparatus and an application. In some embodiments, data transmitted and received between the broadcast service processing apparatus and the application may be in the form of JSON-RPC.

The application may be interested in signaling information or metadata that is distributed and transmitted according to the aforementioned next-generation broadcast system. For example, signaling information such as AEAT, MPD, and OSN may require an application. The signaling information may be relatively rapidly changed in consideration of a life cycle and, accordingly, these changes need to be signaled to the application.

In some embodiments, the application may use a CD web socket API defined to be used by a companion device (CD). However, there is a limit in an application uses an API for the CD or the CD uses an API for an application. For example, the broadcast service processing apparatus may want to know whether web socket connection is achieved by an application or a CD but an API defined for the CD may not provide this function. A receiver manufacturer may not want to support both an interactive environment and the CD API. The CD interface may ask the receiver to reformat signaling data to JSON format friendly to JavaScript. This may cause a burden for converting binary and/or XML form of metadata into JSON format. For application content, the application may poll through a HEAD request to an application context cache hierarchy but this is ineffective.

Accordingly, the application may require an API or the like for acquiring corresponding signaling information or knowing whether the information is updated. In addition, when new or updated files are completely received through a broadcast network or is available by an application context cache, the application may also require an API for knowing the reception. The application may require an API for knowing extended content referenced by AEAT.

In a next-generation broadcast system, a signaling fragment that is OSN may be transmitted to a broadcast service processing apparatus of a receiver side. The OSN may indicate the broadcaster's preference for the receiver to avoid obscuring any part of the video images. For example, when important text or visual information such as emergency warning alert is inserted into video, a broadcaster may prefer not to hide the video. When a KeepScreenClear element of OSN has a 'true' value, the receiver may prevent an application from using a video screen resource. The application may recognize this state to facilitate effective provision of a broadcast service. The OSN may be signaling information and may be transmitted to a receiver side through a broadcast signal.

A broadcast service processing apparatus of a receiver side transmits important data of audio/video such as disaster broadcast to a broadcaster through OSN for a predetermined time period and, thus, the broadcaster may transmit a message not to hide an image by a broadcast application or the like for the corresponding time period.

According to the present invention, even if the broadcast service processing apparatus receives signaling information such as OSN, the apparatus may notify an application about the information or define an API for allowing the application to know the information through a request. The signaling information may further include MPD and/or AEAT. The AEAT may be signaling information including information on emergency. In some embodiments, all other available contents received by the receiver as well as the signaling information may also be transmitted to the application through the API.

The present invention may define APIs for allowing the application to acquire information about whether the broadcast service processing apparatus of the receiver side transmits OSN and information on a state thereof.

For reference, the aforementioned APIs may not provide information on a form of a corresponding URL or a place including referenced content or signaling. In general, files or metadata items may be present in the same level on application context cache hierarchy. Broadcast services may share ROUTE sessions and, thus, AEA enhancement content may be included in a broadcast service that intends to use the content. The content is available by application context cache hierarchy and a broadcaster may take a measurement to prevent collision between the AEA enhancement content and the application content. The prevention may be achieved by preparing a separate AEA directory in content cache hierarchy.

In some embodiments, the application may comply with <baseURL>/<Content-Location> to access an application, application content, or AEA enhancement content on the application context cache hierarchy. However, the application may access MPD, AEAT, and OSN through only a URL acquired by the aforementioned URL request API or the like to access the MPD, the AEAT, or and the OSN.

In some embodiments, the application may transmit a HTTP request to a URL provided by the aforementioned APIs to access related content and/or signaling information. In this case, the MPD, the AEAT, and/or the OSN may have a raw form transmitted from a broadcast network. That is, the receiver may receive corresponding signaling information items through a broadcast network and transmit the information items without change irrespective of format such as XML and a binary. Then, the application may parse the corresponding signaling information according to types to acquire the parsed information.

FIG. 12 is a diagram a URL request API according to an embodiment of the present invention.

The URL request API according to the present invention may be an API issued to a broadcast service processing apparatus by an application for allowing the application to acquire a URL for obtaining predetermined content or signaling metadata.

The application may intent to access various contents and/or signaling metadata items transmitted to a broadcast network or the like. The URL request API may return a list of URLs available by the application to the application. Here, the URL request API may be referred to as a content and signaling URL request API (Query Content and Signaling URL API). Here, the URLs may be, for example, a URL for acquisition of specific content and/or signaling metadata, requested by an application via XHR. In some embodiments, when content and/or metadata is not AEAT and/or OSN applied to all broadcast services, only references (URL) related to a current broadcast service may be returned to the application.

In the illustrated embodiment of the URL request API, the URL request API may be defined as "org.atsc.query.ObjectUrl". The API may include a JSON object 12010 as a parameter.

In detail, the JSON object 12010 may include objectNames.

The objectNames may be an array of content and/or signaling objects. The objectNames may be referred to as key and may be a required element.

The objectNames may include a list of listed values. The list may include values such as MPD, AEAT, OSN, and Content. When the list is empty, the corresponding API may make a request for all of the MPD, the AEAT, the OSN, and the Content.

When the MPD value is included, the value may be used to make a request for the most recent MPD of a current broadcast service. When the AEAT value is included, the value may be used to make a request for the most AEAT. When the OSN value is included, the value may be used to make a request for the most OSN. When the Content value is included, the value may be used to make a request for a list of URLs for acquisition of AEA enhancement content and/or application associated with an application context ID.

In response to the URL request API, the broadcast service processing apparatus may return a JSON object 12020 to an application.

In detail, the JSON object 12020 may include urlList.

The urlList may be a list of references, i.e., URLs. The urlList may be required element. The urlList may include objectName, contentType, objectUrl, and/or receiveTime.

The objectName may be one of content and/or signaling object name. The names may be one of MPD, AEAT, OSN, and Content. The objectUrl corresponding to the objectName may be a URL used to access data according to objectName of a corresponding broadcast service.

The contentType may provide a content type of an object referenced by the objectUrl. The contentType may be an optional parameter. The application may determine whether the corresponding referenced content object is a wanted object using a content type of an object. A contentType value may be a value that is extracted from content-type attribute of EFDT or package information used to transmit content without change.

The objectUrl may be a fully-qualified URL used by an application. The URL may be used to acquire, for example, signaling metadata and/or current broadcast content associated with the objectName for an XHR request.

The receiveTime may indicate a time point of receiving corresponding content and/or signaling object. In some embodiments, the time point may be indicated by date and/or time information. The receiveTime needs to be included in a JSON object when the signaling object is OSN. Here, an OSN table may include a Notification Duration field. The Notification Duration field may indicate a duration time of a KeepScreenClear message indicating that an image needs to be empty and the duration time may be started from a time point of receiving OSN. Accordingly, the time point of receiving the OSN may be required to appropriately use the OSN by an application.

The aforementioned URL request APIs according to embodiments of the present invention may be combined. In a broadcast service processing apparatus according to embodiments of the present invention, a URL request API may be the URL request API according to the aforementioned embodiments.

FIG. 13 is a diagram showing an application example of a URL request API according to the present invention.

In the illustrated application example of the URL request API, an application may issue a URL request API to a broadcast service processing apparatus (13010). The URL request API may be defined as "org.atsc.query.ObjectUrl". In the application example, the URL request API may make a request for AEAT, MPD, and OSN.

In response to the URL request API, the broadcast service processing apparatus may also return a JSON object to the application (13020). In the JSON object, urlList may include objectUrl information on MPD, AEAT, and OSN. As described above, with regard to the OSN, receiveTime may be a required element. Accordingly, the JSON object may further include "2017-01-01T23:54:59.590Z" that is a time point of receiving the corresponding OSN, as a receiveTime value.

In some embodiments, the AEAT may have a form of the aforementioned LLS table. Accordingly, the application may use the AEAT in consideration of binary header data preceding an XML AEAT section.

FIG. 14 is a diagram showing a signaling change notification API according to an embodiment of the present invention.

The signaling change notification API according to the present invention may be an API issued to an application by a broadcast service processing apparatus and, when subscribed content and/or signaling metadata is changed, the signaling change notification API may be an API for notifying the application about the change.

The signaling change notification API may be referred to as content and signaling change notification API. In some embodiments, the signaling change notification API may be issued by a currently executed application. The signaling change notification API may be issued when there is a change in a version of MPD, AEAT, OSN, and/or content files subscribed by an application to receive the notification through a signaling change subscribe API to be described later. In some embodiments, reception of a new content file or signaling object may be considered as version change. A notification message according to the signaling change notification API may include a list for referencing new or updated content and/or signaling metadata.

In the illustrated embodiment of the signaling change notification API, the signaling change notification API may be defined as "org.atsc.notify". The API may include a JSON object as a parameter. The JSON object may include urlList. The urlList may include objectName, contentType, objectUrl, and/or receiveTime.

In response to the aforementioned URL request API, the illustrated JSON object may be the same as the JSON object 12020 transmitted to the application. The urlList, objectName, contentType, objectUrl, and/or receiveTime in the JSON object may also have the same meaning as the aforementioned information items of the JSON object 12020.

In some embodiments, when the JSON object is transmitted to the application according to the signaling change notification API, the application may not respond thereto. Accordingly, 'id' information may be omitted from the JSON object. This is because that is no procedure of a request and a response thereto.

The aforementioned signaling change notification APIs according to embodiments of the present invention may be combined. In a broadcast service processing apparatus according to embodiments of the present invention, a signaling change notification API may be the aforementioned signaling change notification API according to the embodiments.

FIG. 15 is a diagram showing an application example of a signaling change notification API according to the present invention.

In the illustrated application example of a signaling change notification API (15010), a broadcast service processing apparatus may issue a signaling change notification API to an application. Thereby, the broadcast service processing apparatus may notify the application about reception of a new MPD. The signaling change notification API may be defined as "org.atsc.notify". In the application example, a URL list of the signaling change notification API may include objectUrl information for acquisition of MPD.

In the illustrated application example of a signaling change notification API (15020), a broadcast service processing apparatus may issue a signaling change notification API to an application. Thereby, the broadcast service processing apparatus may notify the application about reception of new AEAT and OSN. The signaling change notification API may be defined as "org.atsc.notify". In the application example, a URL list of the signaling change notification API may include objectUrl information items for acquisition of AEAT and OSN. As described above, with regard to the OSN, the receiveTime may be a required element. Accordingly, the JSON object may further include "2017-01-01T23:54:59.590Z" that is a time point of receiving the corresponding OSN, as a receiveTime value.

Similarly, the AEAT may have a form of the aforementioned LLS table. Accordingly, the application may use the AEAT in consideration of binary header data preceding an XML AEAT section. In some embodiments, a prefix or the like of an ".lls" directory defined by the receiver may be different from an application context cache determined by a receiver according to an embodiment of the present invention.

In the illustrated application example of a signaling change notification API (15030), a broadcast service processing apparatus may issue a signaling change notification API to an application. Thereby, the broadcast service processing apparatus may notify the application about reception of a new version of various content files and/or signaling metadata. The signaling change notification API may be defined as "org.atsc.notify". In the application example, a URL list of the signaling change notification API may include objectUrl information items for acquisition of app data of image/png, text/css, text/html, or the like.

In some embodiments, upon receiving notification according to the signaling change notification API, the application may select whether the application is reloaded or a portion thereof is reloaded.

FIG. 16 is a diagram showing an example of a signaling change subscribe API according to an embodiment of the present invention The signaling change subscribe API according to the present invention may be an API issued to the broadcast service processing apparatus bay an application and, upon receiving new content and/or signaling metadata or new version of content and/or signaling metadata, the signaling change subscribe API may be an API to be notified about the information.

When subscription is achieved, if the application receives new content and/or signaling metadata or new version of content and/or signaling metadata, the application may receive corresponding notification from the broadcast service processing apparatus. The signaling change subscribe API may be referred to as content and signaling change subscribe API (Subscribe Content and Signaling Changes API).

When there is any addition or version change, the broadcast service processing apparatus may issue the aforementioned signaling change notification API to a subscribed application. The notification may be continuously performed until subscription is canceled by the signaling change unsubscribe API to be described later. The notification may be continuously performed until a broadcast service is changed.

In the illustrated embodiment of a signaling change subscribe API (16010), the signaling change subscribe API may be defined as "org.atsc.subscribeObjectChange". The API may include a JSON object 16010 as a parameter.

In detail, the JSON object 16010 may include objectNames.

The objectNames may be an array of names of content and/or signaling objects. The objectNames may be referred to as key and may be a required element.

The objectNames may include a list of listed values. The list may include values of MPD, AEAT, OSN, and Content.

When the list is empty, the corresponding API may make a request for subscription of all of the MPD, the AEAT, the OSN, and the Content.

When the MPD value is included, if updated MPD of a current broadcast service is received, the value may be used to make a request for subscription for notification of the reception. When the AEAT value is included, if updated AEAT is received, the value may be used to make a request for subscription for notification of the reception. When the OSN value is included, if updated OSN is received, the value may be used to make a request for subscription for notification of the reception. When the Content value is included, if new or updated application or AEA enhancement content is received, the value may be used to make a request for subscription for notification of the reception.

In the illustrated embodiment of a signaling change subscribe API (16020), an application may issue a signaling change subscribe API to a broadcast service processing apparatus. Thereby, the application may subscribe for receiving notification when corresponding information items are updated or a new version is received with regard to 'AEAT', 'MPD', and 'Content'. That is, the application may subscribe to 'AEAT', 'MPD', and 'Content' through the API.

In the illustrated embodiment of a signaling change subscribe API (16030), when subscription is successfully performed, the broadcast service processing apparatus may transmit the illustrated message 16030 as a response to the application.

As described above, when subscription is completed, upon receiving new or updated AEAT or the like, the broadcast service processing apparatus (broadcast receiver) may notify the application about the reception. Alternatively, when a predetermined file of an application context cache is updated or added, the broadcast service processing apparatus may also notify the application about the updating or the addition.

In some embodiments, notification of the application or the AEA enhancement file may be performed after files are extracted from a package and are checked for signaling. Here, application files may be application files matched with an application context ID and/or filter codes.

The aforementioned signaling change subscribe APIs according to embodiments of the present invention may be combined. In a broadcast service processing apparatus according to embodiments of the present invention, a signaling change subscribe API may be the aforementioned signaling change subscribe API according to embodiments of the present invention.

FIG. 17 is a diagram showing a signaling change unsubscribe API according to an embodiment of the present invention.

The signaling change unsubscribe API according to the present invention may be an API issued to a broadcast service processing apparatus and an API for unsubscription by the aforementioned signaling change subscribe API. The signaling change unsubscribe API may be referred to as content and signaling change unsubscribe API (Unsubscribe Content and Signaling Changes API). Thereby, the application may stop receiving notification of updating or addition of content and/or signaling.

In the illustrated embodiment of a signaling change unsubscribe API, the signaling change unsubscribe API may be defined as "org.atsc.unsubscribeObjectChange". The signaling change unsubscribe API may include a JSON object 17010 as a parameter.

The JSON object 17010 may include objectNames.

The objectNames may be an array of names of content and/or signaling objects. The objectNames may be referred to as key and may be a required element.

The objectNames may include a list of listed values. The list may include values of MPD, AEAT, OSN, Content, and the like. The application may unsubscribe a signaling object or the like included in the list. When the list is empty, the corresponding API may unsubscribe all of the MPD, AEAT, OSN, and Content.

For example, when the MPD, the AEAT, and the OSN are included, the application may unsubscribe the MPD, the AEAT, and the OSN by adding the MPD, the AEAT, and the OSN to the list of the API.

In the illustrated application example of the signaling change unsubscribe API (17020), an application may issue the signaling change unsubscribe API to a broadcast service processing apparatus. The signaling change unsubscribe API may be defined as "org.atsc.unsubscribeObjectChange". In the application example, the URL request API may make a request for unsubscription of AEAT.

When unsubscription is successfully performed, the broadcast service processing apparatus may transmit a message indicating that unsubscription is successfully performed to the application as a response (17030). Here, "id" information may be matched with "id" of the signaling change unsubscribe API.

Here, when the application subscribes a plurality of signaling objects, if the AEAT is unsubscribed via the aforementioned procedure, notification of other subscribed signaling objects except for the AEAT may be continuously performed.

In the illustrated embodiment of a signaling change subscribe API (17040), the application may issue a signaling change unsubscribe API for whole unsubscription to the broadcast service processing apparatus. As described above, in the application example, the list of JSON objects may be empty.

The aforementioned signaling change unsubscribe APIs according to embodiments of the present invention may be combined. In a broadcast service processing apparatus according to embodiments of the present invention, a signaling change unsubscribe API may be the aforementioned signaling change unsubscribe API according to embodiments of the present invention.

FIG. 18 is a diagram showing an OSN request API according to an embodiment of the present invention.

The OSN request API according to the present invention may be an API issued to a broadcast service processing apparatus by an application and may be an API for a query of whether the OSN of the broadcast service processing apparatus is transmitted and a state thereof. The broadcast service processing apparatus may transmit elements of the OSN to the application according to the OSN request API and the application may directly infer whether a display is hidden.

A broadcast service processing apparatus (broadcast receiver) may receive an OSN fragment. The broadcast service processing apparatus may transmit information of @notificationDuration, @kscFlag, and @version related to a current service in the OSN along with receptionTime of the OSN to the application according to the API. The application may make a request for information on a current OSN fragment to determine whether a current situation is appropriate to drive the application.

In the illustrated embodiment of an OSN request API, the OSN request API may be defined as "org.atsc.query.onscreenMessageNotification". Here, a parameter of the API may be omitted.

In this regard, the broadcast service processing apparatus may transmit a response to the OSN request API to an application (18010). The response may include a JSON object 18010.

The JSON object may include receptionTime, notificationDuration, kscFlag, and/or version.

The receptionTime may indicate a reception time of receiving corresponding OSN information. The receptionTime may be a required element.

The notificationDuration may indicate a duration time for clearing a screen for important text/visual information of the screen. Here, start of the duration time may be the aforementioned receptionTime.

The kscFlag may indicate a state of screen clear. Here, the kscFlag may indicate whether a screen is cleared according to true/false. In some embodiments, the broadcast service processing apparatus may also transmit corresponding information to the application at a time point when the @kscFlag is back to a false value. In some embodiments, the application may directly query corresponding information to the broadcast service processing apparatus to acquire corresponding information.

The version may indicate a version of a corresponding screen clear and screen clear element of the OSN.

In the illustrated application example of the OSN request API (18020), the application may issue the OSN request API to a broadcast service processing apparatus. The OSN request API may be defined as "org.atsc.query.onscreenMessageNotification".

In response to the OSN request API, the broadcast service processing apparatus may return the JSON object to the application (18030). The JSON object may indicate a reception time of the OSN, duration time of screen clear, a state and a version of a screen clear, and the like.

The aforementioned OSN request APIs according to embodiments of the present invention may be combined. In a broadcast service processing apparatus according to embodiments of the present invention, the OSN request API may be the OSN request API according to the aforementioned embodiments of the present invention.

FIG. 19 is a diagram showing an OSN notification API according to an embodiment of the present invention.

The OSN notification API according to the present invention may be an API issued to an application by a broadcast service processing apparatus and may be an API for performing a procedure corresponding to the aforementioned OSN request API and a response thereto in the form of notification.

That is, the OSN notification API may allow the broadcast service processing apparatus to transmit information of @notificationDuration, @kscFlag, @version, and the like related to a current service in OSN and/or receptionTime of the OSN to the application. Here, the OSN notification API may be referred to as an Onscreen Message Change Notification API.

In the illustrated embodiment of the OSN notification API (19010), the OSN notification API may be defined as "org.atsc.notify". The API may include a JSON object as a parameter.

The JSON object 19010 may further include msgType as well as receptionTime, notificationDuration, kscFlag, and version elements of the aforementioned OSN request API.

The receptionTime, notificationDuration, kscFlag, and version elements may have the same meaning as in the aforementioned OSN request API. The msgType may indicate a signaling object indicated by content to be transmitted through a corresponding JSON object. Here, the msgType may indicate OSN.

In some embodiments, when a JSON object is transmitted to the application according to the OSN notification API, the application may not response thereto. Accordingly, 'id' information may be omitted from the JSON object.

In the illustrated application example of the OSN notification API (19020), the broadcast service processing apparatus may issue the OSN notification API to the application. The API may be defined as "org.atsc.notify". In the application example, the JSON object may indicate reception time of the OSN, duration time of screen clear, a state and version of screen clear, and so on.

The aforementioned OSN notification APIs according to embodiments of the present invention may be combined. In a broadcast service processing apparatus according to embodiments of the present invention, the OSN notification API may be the aforementioned OSN notification API according to the aforementioned embodiment of the present invention.

FIG. 20 is a diagram showing a screen clean request API according to an embodiment of the present invention.

The screen clean request API according to the present invention may be an API issued to a broadcast service processing apparatus by an application and may be an API for query of whether a current screen state is clear.

A flag indicating a state of a screen of the broadcast service processing apparatus may be defined and change in the corresponding flag may be indicated to the application through a screen clean request API and/or a screen clean notification API. When the screen clean request API is used, the application may query a clear (clean) state of a current screen to acquire a value of the flag. When the screen clean notification API is used, the broadcast service processing apparatus may notify the application about the use whenever the clear state of the current screen is changed. In this case, the aforementioned flag of the screen clear state may be transmitted and, simultaneously, effective time information of the corresponding flag may also be transmitted.

In the illustrated embodiment of the screen clean request API, the application may issue the screen clean request API to the broadcast service processing apparatus. The API may be defined as "org.atsc.query.screenClean". A parameter of the API may be omitted.

In this regard, the broadcast service processing apparatus may transmit a query to the screen clean request API to the application (20010). The response may include a JSON object 20010.

The JSON object may include validFrom, validUntil, and/or clean.

The validFrom may indicate reception time of OSN of a receiver. In some embodiments, the validFrom may indicate a time point of a valid duration of a flag indicating the aforementioned screen clear state. That is, the corresponding flag may be valid from a time point indicated by the validFrom.

The validUntil may indicate a time obtained by summing the reception time of the OSN and the aforementioned duration time of the notificationDuration. In some embodiments, the validUntil may indicate an end time of a valid time of a flag indicating the aforementioned screen clear state. That is, the corresponding flag may be valid up to only a time point indicated by the validUntil.

The clean may indicate a corresponding flag value. That is, the clean may indicate a current state of screen clear.

In the illustrated application example of a screen clean request API (20020), an application may issue a screen clean request API to a broadcast service processing apparatus. The screen clean request API may be defined as "org.atsc.query.screenClean".

In response to the screen clean request API, the broadcast service processing apparatus may also return a JSON object to the application (20030). The JSON object may include the aforementioned clean flag. It may be seen that the flag is valid to "2017-01-01T23:59:59.590Z" from "2017-01-01T23:54:59.590Z".

The aforementioned screen clean request APIs according to embodiments of the present invention may be combined. In a broadcast service processing apparatus according to embodiments of the present invention, a screen clean request API may be the aforementioned screen clean request API according to embodiments of the present invention.

FIG. 21 is a diagram showing a screen clean notification API according to an embodiment of the present invention.

The screen clean notification API according to the present invention may be an API issued to an application nay a broadcast service processing apparatus and may be an API for performing a procedure corresponding to the aforementioned screen clean request API and a response thereto in the form of notification.

In the illustrated embodiment of a screen clean notification API (21010), the screen clean notification API may be defined as "org.atsc.notify". The screen clean notification API may include a JSON object 21010.

The JSON object 21010 may further include msgType as well as validFrom, validUntil, and/or clean of the aforementioned screen clean request API.

The validFrom, validUntil, and clean elements may have the same meaning as in the aforementioned screen clean request API. The msgType may indicate a type of a message to be transmitted through a corresponding JSON object. Here, the msgType may indicate ScreenClean.

In some embodiments, when a JSON object is transmitted to an application according to a screen clean notification API, the application may not respond thereto. Accordingly, 'id' information may be omitted from the JSON object.

In the illustrated application example of the screen clean notification API (21020), the broadcast service processing apparatus may issue the screen clean notification API to an application. The screen clean notification API may be defined as "org.atsc.notify". The JSON object may include the aforementioned clean flag. It may be seen that the flag may be valid to "2017-01-01T23:59:59.590Z" from "2017-01-01T23:54:59.590Z".

The aforementioned screen clean notification APIs according to embodiments of the present invention may be combined. In a broadcast service processing apparatus according to embodiments of the present invention, a screen clean notification API may be the aforementioned screen clean notification API according to embodiments of the present invention.

FIG. 22 is a diagram showing a display override request API according to an embodiment of the present invention.

The display override request API according to the present invention may be an API issued to a broadcast service processing apparatus by an application and may be an API for transmitting information items related to change in an image by OSN in the form of a flag. Information items such as resourceBlocking and displayOverride may be transmitted by the API.

The application may intend to know whether the broadcast service processing apparatus receives 'display override' signaling through a watermark or the like. Here, the display override may indicate whether modification is not required to be performed on video/audio presentation. Alternatively, the display override may signal whether an application needs to block access to a presentation resource (resource blocking). In some embodiments, the application may intend to know whether the broadcast service processing apparatus receives OSN information, as described above.

The display override information and/or the OSN information may be used by an application to effectively use a broadcast service processing apparatus and/or a network resource. For example, the application may not make a request for resources that are not capable of being reproduced to a user, to a broadband server.

The information may be used to preserve accurate reproduction of user experience. For example, the application may accurately report viewability of dynamically inserted advertisement as requirement of advertisement viewability standard.

The information may be used to satisfy requirement of a display override state. For example, the application may block modification of audio/video when the broadcast service processing apparatus does not perform resource blocking.

In the illustrated embodiment of a display override request API, the display override request API may be defined as "org.atsc.query.displayOverride". A parameter of the API may be omitted.

In addition, the broadcast service processing apparatus may transmit a response to the display override request API to the application (22010). A response thereto may include a JSON object 22010.

The JSON object may include resourceBlocking and/or displayOverride.

The resourceBlocking may indicate whether the broadcast service processing apparatus blocks the application to reproduce video/audio according to an active display override state. The resourceBlocking may be a required element and may be Boolean format. In some embodiments, resourceBlocking information may be basically in a false state.

The displayOverride may indicate whether a current display override state is valid, such as a display override message of a video watermark or display override indication of an audio watermark. The displayOverride may be a required element and may be Boolean format. The displayOverride may be determined by an OSN fragment. In some embodiments, displayOverride information may be basically in a false state.

In some embodiments, when there is no key/value pair, this may indicate that corresponding values are a false value.

In the illustrated application example of a display override request API, an application may issue the display override request API to a broadcast service processing apparatus (22020). The display override request API may be defined as "org.atsc.query.resourceBlocking".

In response to the display override request API, the broadcast service processing apparatus may also return a JSON object to the application (22030). In the JSON object, resourceBlocking and displayOverride may have a true value. In this case, a display override condition is currently indicated by an audio watermark and the broadcast service processing apparatus blocks the application to reproduce video/audio.

In response to the display override request API, the broadcast service processing apparatus may also return the JSON object to the application (2204). In the JSON object, resourceBlocking and displayOverride may have false and true values, respectively. In this case, a display override state is currently changed by the OSN fragment.

The aforementioned display override request APIs according to embodiments of the present invention may be combined. In a broadcast service processing apparatus according to embodiments of the present invention, a display override request API may be the aforementioned display override request API according to embodiments of the present invention.

FIG. 23 is a diagram showing a method of acquiring a WebSocket sever address by an application according to an embodiment of the present invention.

The method of acquiring a WebSocket sever address by an application according to the present invention may be a method for accessing a WebSocket sever of the broadcast service processing apparatus. The aforementioned broadcast service processing apparatus may further include a WebSocket sever. The application may use various methods to access the WebSocket sever.

In a next-generation broadcast system, a communication protocol between a primary device (PD) and a companion device (CD) may be defined. Here, the PD may correspond to the aforementioned broadcast service processing apparatus. On a web browser of the PD, a PD application may be executed. Here, the web browser may be driven by the aforementioned processor of the broadcast service processing apparatus. The PD application may interact with a CD application through a WebSocket server of the PD. Methods of acquiring a URL of the WebSocket server may be defined to access the WebSocket server by the PD application.

The method of acquiring a WebSocket sever address by an application, i.e., methods of acquiring a URL of the WebSocket sever for access to the WebSocket sever by the PD application will now be described.

In some embodiments, the PD application may pre-acquire a WebSocket URL when the application is launched. Here, the application may be launched through the following WebSocket communication.

http://localhost/xbc.org/x.y.z/home.html?wsURL=wss://localhost:8000

In the illustrated table of a WebSocket server function and URLs, WSPath/astsCD may be added as in a last row. Thereby, the PD application and/or CD and a URL of the WebSocket server for the CD application may be acquired as follows.

wss://localhost:8000/atscCD

In some embodiments, a query component for a WebSocket URL when an application is executed may be defined. cdwsURL for a CD WebSocket server may be defined and the query component may be defined as follows.

query="cdwsURL=" ws-url

Here, when an entry page URL is http://localhost/xbc.org/x.y.z/home.html, the application may be executed as follows.

http://localhost/xbc.org/x.y.z/home.html?wsURL=wss://localhost:8000?cdw sURL=wss://localhost:8800

Here, the URL of the CD WebSocket server may be checked as follows.

wss://localhost:8800

In some embodiments, an existing defined JSON objet API may be changed and used in the form of JSON RPC. In this case, the CD WebSocket server may be an integrated Command and Control Websocket Server.

In some embodiments, getApp2AppLocalBaseURL( ) that is conventionally defined in HbbTV may be used. The getApp2AppLocalBaseURL( ) may be communication for returning a base URL of an application to an application communication service local end point. Communication between the HbbTV application and a remote client may be performed through the endpoint. A URL acquired via this method may be ended with slash (/). A URL of the WebSocket server may be acquired using getApp2AppLocalBaseURL( ).

The aforementioned methods of acquiring a WebSocket server address according to embodiments of the present invention may be combined. In a broadcast service processing apparatus according embodiments of the present invention, a method of acquiring a WebSocket server address by an application may be the aforementioned method of acquiring the WebSocket server address by the application according to the aforementioned of the present invention.

Figure 24:
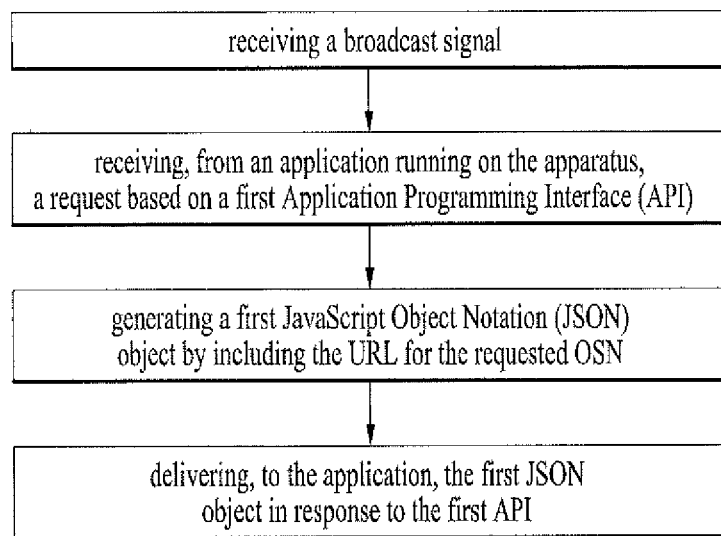
FIG. 24 is a diagram showing a method of processing a broadcast service to be performed by a broadcast service processing apparatus according to an embodiment of the present invention.

FIG. 24 is a diagram showing a method of processing a broadcast service to be performed by a broadcast service processing apparatus according to an embodiment of the present invention.

The method of processing a broadcast service in an apparatus includes, receiving a broadcast signal, receiving, from an application running on the apparatus, a request based on a first Application Programming Interface (API), generating a first JavaScript Object Notation (JSON) object by including the URL for the requested OSN and delivering, to the application, the first JSON object in response to the first API.

The tuner can receive a broadcast signal including service data for the broadcast service and signaling information for signaling the broadcast service. Here, the signaling information includes On Screen message Notification (OSN) which indicates a preference of a broadcaster for the apparatus to avoid obscuring video images of the broadcast service. The signaling information can be delivered to the apparatus in various ways. Here, the apparatus may correspond to the apparatus for the processing the broadcast service.

The processor can communicate with an application running on the apparatus. The processor can receive, from the application, a request based on a first Application Programming Interface (API). The first API may correspond to 'URL request API' described above. The first API includes information for indicating that the request is for a Uniform Resource Locator (URL) referencing the most recent OSN.

The processor can generate a first JavaScript Object Notation (JSON) object by including the URL for the requested OSN. Then the processor can deliver, to the application, the first JSON object in response to the first API.

In the method of processing a broadcast service according to other embodiment of the present invention, in step of the generating the first JSON object, the processor may add adding time information to the first JSON object. Here, the time information is for indicating when the requested OSN is received.

In the method of processing a broadcast service according to another embodiment of the present invention, the processor may receive a subscription from the application based on a second API. The second API may correspond to 'signaling change subscribe API'. The second API is for the application to be notified when changes in an OSN occur.

In the method of processing a broadcast service according to another embodiment of the present invention, the second API issued by the application includes a second JSON object, and the second JSON object includes information for requesting the apparatus to notify the application when a new or updated OSN is received.

In the method of processing a broadcast service according to another embodiment of the present invention, the processor may deliver a notification to the subscribed application by issuing a third API. The third API may correspond to 'signaling change notification API'. The third API is for delivering the notification indicating a presence of changes in an OSN.

In the method of processing a broadcast service according to another embodiment of the present invention, the notification based on the third API includes a third JSON object, and the third JSON object includes an URL for referencing a new or updated OSN and time information for indicating when the new or updated OSN is received.

In the method of processing a broadcast service according to another embodiment of the present invention, the application communicates with the apparatus via a WebSocket protocol.

The methods of processing a broadcast service according to embodiments of the present invention may be combined.

Modules or units may correspond to processors that execute continuous processes stored in a memory (or a storage unit). The respective steps described in the above-described embodiments may be performed by hardware/processors. The respective modules/blocks/units described in the above embodiments may operate as hardware/processors. In addition, the methods proposed in the present invention may be executed as codes. These codes may be written in a processor-readable storage medium, and thus may be read by a processor provided by an apparatus.

Even though the respective drawings have been separately described for convenience of description, embodiments described in the respective drawings may be merged into a new embodiment. In addition, designing of a computer-readable recording medium in which a program for executing the above-described embodiments according to necessity of a person skilled in the art is within the scope of the present invention.

Referring to the apparatuses and methods according to the present invention, configurations and methods of the embodiments are not restrictively applicable, and all or some of the above-described embodiments may be selectively combined and configured such that the embodiments can be variously changed Meanwhile, the methods proposed in the present invention may be implemented as processor-readable code stored in a processor-readable recording medium included in a network device. The processor-readable recording medium includes all types of recording devices in which processor-readable data is stored. Examples of the processor-readable recording medium include a ROM, a RAM, a CD-ROM, a magnetic tape, a floppy disk, an optical data storage device, etc. In addition, the examples include a carrier-wave type implementation such as a transmission over the Internet. Furthermore, as the processor-readable recording medium is distributed to a computer system connected via a network, processor-readable code can be saved and executed in a distributed manner.

Further, even though preferred embodiments of the present invention have been illustrated and described, the present invention is not restricted to a certain embodiment described above, and various modifications and variations can be made by those skilled in the art without departing from the subject matter of the present invention as defined by the claims. Furthermore, these modified embodiments should not be understood separately from the spirit or scope of the present invention.

Both apparatus and method inventions are mentioned in this specification and descriptions of both the apparatus and method inventions may be complementarily applicable to each other.

It should be understood by those skilled in the art that various changes and modifications can be made in the present invention within the spirit or scope of the present invention. Therefore, the present invention is intended to include changes and modifications of the present invention within the scope of accompanying claims and equivalents thereof.

Both apparatus and method inventions are mentioned in this specification and descriptions of both the apparatus and method inventions may be complementarily applicable to each other.

MODE FOR INVENTION

Various embodiments have been described in best modes.

INDUSTRIAL APPLICABILITY

The present invention is used in a series of broadcast signal provision fields.

It is clear to those skilled in the art that various changes and modifications can be made in the present invention within the spirit or scope of the present invention. Therefore, the present invention is intended to include changes and modifications of the present invention within the scope of accompanying claims and equivalents thereof.

What is claimed is:

1. A method of processing a broadcast service in an apparatus, the method comprising:
receiving a broadcast signal including service data for the broadcast service and signaling information for signaling the broadcast service,
wherein the signaling information includes On Screen message Notification (OSN) which notifies to a receiver a preference of a broadcaster for the receiver to avoid obscuring a part of video images, and
wherein the OSN includes duration information for identifying a duration of KeepScreenClear information related to keep screen clear status corresponding to on-screen text or visual information, flag information for identifying a status of the KeepScreenClear information and version information for identifying a version of the KeepScreenClear information;
receiving, from an application running on the apparatus, a request based on a first Application Programming Interface (API), wherein the first API includes information for identifying that the request is for an Uniform Resource Locator (URL) referencing the most recent OSN;
generating a first JavaScript Object Notation (JSON) object by including the URL for the requested OSN; and
delivering, to the application, the first JSON object in response to the first API.

2. The method of claim 1, wherein the generating the first JSON object further comprising comprises:
adding time information to the first JSON object, the time information for identifying when the requested OSN is received.

3. The method of claim 1, further comprising:
receiving a subscription from the application based on a second API, wherein the second API is for the application to be notified when changes in an OSN occur.

4. The method of claim 3, wherein the second API issued by the application includes a second JSON object and wherein the second JSON object includes information for requesting the apparatus to notify the application when a new or updated OSN is received.

5. The method of claim 3, further comprising:
delivering a notification to the subscribed application by issuing a third API, wherein the third API is for delivering the notification for identifying a presence of changes in an OSN.

6. The method of claim 5, wherein the notification based on the third API includes a third JSON object, and
wherein the third JSON object includes an URL for referencing a new or updated OSN and time information for identifying when the new or updated OSN is received.

7. The method of claim 1, wherein the application communicates with the apparatus via an WebSocket protocol.

8. An apparatus for processing a broadcast service, the apparatus comprising:
a tuner configured to receive a broadcast signal including service data for the broadcast service and signaling information for signaling the broadcast service,
wherein the signaling information includes On Screen message Notification (OSN) which notifies to a receiver a preference of a broadcaster for the receiver to avoid obscuring a part of video images, and
wherein the OSN includes duration information for identifying a duration of KeepScreenClear information related to keep screen clear status corresponding to on-screen text or visual information, flag information for identifying a status of the KeepScreenClear information and version information for identifying a version of the KeepScreenClear information; and
a processor operatively coupled to the tuner and configured to:
receive, from an application running on the apparatus, a request based on a first Application Programming Interface (API), wherein the first API includes information for identifying that the request is for an Uniform Resource Locator (URL) referencing the most recent OSN,
generate a first JavaScript Object Notation (JSON) object by including the URL for the requested OSN, and
deliver, to the application, the first JSON object in response to the first API.

9. The apparatus of claim 8, wherein, to generate the first JSON object, the processor is further configured to:
add time information to the first JSON object, the time information for identifying when the requested OSN is received.

10. The apparatus of claim 8, wherein the processor is further configured to:
receive a subscription from the application based on a second API, wherein the second API is for the application to be notified when changes in an OSN occur.

11. The apparatus of claim 10, wherein the second API issued by the application includes a second JSON object, and
wherein the second JSON object includes information for requesting the apparatus to notify the application when a new or updated OSN is received.

12. The apparatus of claim 10, wherein the processor is further configured to:
deliver a notification to the subscribed application by issuing a third API, wherein the third API is for delivering the notification for identifying a presence of changes in an OSN.

13. The apparatus of claim 12, wherein the notification based on the third API includes a third JSON object, and
wherein the third JSON object includes an URL for referencing a new or updated OSN and time information for identifying when the new or updated OSN is received.

14. The apparatus of claim 8, wherein the application communicates with the apparatus via an WebSocket protocol.

* * * * *